(12) United States Patent
Cochran

(10) Patent No.: US 7,632,391 B2
(45) Date of Patent: Dec. 15, 2009

(54) CRITICAL ORIFICE GAP SETTING FOR GROOVING FLUID DYNAMIC BEARINGS

(75) Inventor: Dustin Alan Cochran, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 437 days.

(21) Appl. No.: 11/270,964

(22) Filed: Nov. 11, 2005

(65) Prior Publication Data
US 2006/0065549 A1 Mar. 30, 2006

Related U.S. Application Data

(62) Division of application No. 10/609,895, filed on Jun. 30, 2003, now abandoned.

(51) Int. Cl.
*B23H 7/04* (2006.01)
*B23H 3/00* (2006.01)
(52) U.S. Cl. .................................... 205/672
(58) Field of Classification Search ............... 204/224; 205/672
See application file for complete search history.

(56) References Cited

U.S. PATENT DOCUMENTS

| | | | | |
|---|---|---|---|---|
| 3,637,481 A | * | 1/1972 | Williams | 204/224 M |
| 3,801,487 A | * | 4/1974 | Pahl | 204/224 M |
| 6,764,590 B1 | | 7/2004 | Cochran | |
| 6,767,438 B2 | | 7/2004 | Cochran | |
| 2002/0126923 A1 | | 9/2002 | Usui | |
| 2003/0221959 A1 | | 12/2003 | Cochran | |

FOREIGN PATENT DOCUMENTS

| GB | 1062593 | 3/1967 |
|---|---|---|
| JP | 02145800 | 5/1990 |

OTHER PUBLICATIONS

U.S. Appl. No. 10/464,581, filed Jun. 17, 2003, entitled: Method and Apparatus for Forming Grooves within Journals and on Flat Plates.

* cited by examiner

*Primary Examiner*—Harry Wilkins
*Assistant Examiner*—Zulmariam Mendez
(74) *Attorney, Agent, or Firm*—William D. Zahrt, II

(57) ABSTRACT

An apparatus and method are provided for electrochemically etching grooves in a working surface. In an aspect, a frame holds a working surface about an axis and facing an electrode movable along the axis. The electrode, axially movable, has surface carrying a groove pattern to fix on the working surface. A source of electrolyte is pumped at a fixed static pressure rate between the surface of the movable electrode and the working surface. In an aspect, a support fixture supports the electrode for movement toward and away from the working surface with minimal frictional restriction. A force biases the electrode surface toward the working surface so that a gap through which the electrolyte flows between the surface of the movable electrode and the working surface is determined primarily by the static flow rate of the electrolyte and the force bias of the electrode toward the working surface.

20 Claims, 5 Drawing Sheets

CRITICAL ORIFICE GAP SETTING FOR GROOVING FLUID DYNAMIC BEARINGS

CROSS REFERENCE TO RELATED APPLICATION

This application claims priority from and benefit under 35 U.S.C. sec. 120 as a Divisional patent application of U.S. non-provisional patent application Ser. No. 10/609,895, filed Jun. 30, 2003, now abandoned entitled "Critical Orifice Gap Setting For ECM Grooving Of Flat Plates," assigned to the assignee of the present application and incorporated herein by reference.

FIELD OF THE INVENTION

This invention relates generally to the field of fluid dynamic bearings, and more particularly to gap setting for forming grooves in flat plates and cones used in a disc drive.

BACKGROUND OF THE INVENTION

Disc drives, including magnetic disc drives, optical disc drives and magneto-optical disc drives, are widely used for storing information. A typical disc drive has one or more discs or platters that are affixed to a spindle and rotated at high speed past a read/write head suspended above the discs on an actuator arm. The spindle is turned by a spindle drive motor. The motor generally includes a shaft having a thrust plate on one end, and a rotating hub having a sleeve and a recess into which the shaft with the thrust plate is inserted. Magnets on the hub interact with a stator to cause rotation of the hub relative to the shaft.

In the past, conventional spindle motors frequently used conventional ball bearings between the hub and the shaft and the thrust plate. However, over the years the demand for increased storage capacity and smaller disc drives has led to the read/write head being placed increasingly close to the disc. Currently, read/write heads-are often suspended no more than a few millionths of an inch above the disc. This proximity requires that the disc rotate substantially in a single plane. To provide a stable rotating system and avoid non-repeatable run-out, the latest generation of disc drives utilize a spindle motor having fluid dynamic bearings on the shaft and the thrustplate to support a hub and the disc for rotation.

In a fluid dynamic bearing, a lubricating fluid such as gas or a liquid or air provides a bearing surface between a fixed member and a rotating member of the disc drive. Dynamic pressure-generating grooves formed on a surface of the fixed member or the rotating member generate a localized area of high pressure or a dynamic cushion that enables the spindle to rotate with a high degree of accuracy. Typical lubricants include oil and ferromagnetic fluids. Fluid dynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a fluid dynamic bearing. Also, the use of fluid in the interface area imparts damping effects to the bearing that helps to reduce non-repeat runout. However, to be effective, the pressure-generating grooves must be very accurately defined, both as to shape and depth, on a high-speed basis.

Accordingly, there is a need for an apparatus and method for forming grooves in a work piece made of a hard metal to manufacture fluid dynamic bearings suitable for use in a disc drive. It is desirable that the apparatus and method allow the grooves to be formed quickly and cheaply. It is also desirable that the apparatus and method not require expensive equipment or the use of a metal-removing tool that must be frequently replaced. It is further desirable that the apparatus and method not use an etch-resistant material during manufacture that could contaminate the work piece leading to the failure of the bearing and destruction of the disc drive.

As the result of the above problems, electrochemical machining (ECM) of grooves in a fluid dynamic bearing has been developed. A broad description of ECM is as follows. ECM is a process of removing material metal without the use of mechanical or thermal energy. Basically, electrical energy is combined with a chemical to form a reaction of reverse electroplating. To carry out the method, direct current is passed between the work piece which serves as an anode and the electrode, which typically carries the pattern to be formed and serves as the cathode, the current being passed through a conductive electrolyte which is between the two surfaces. At the anode surface, electrons are removed by current flow, and the metallic bonds of the molecular structure at the surface are broken. These atoms go into solution with the electrolyte as metal ions and form metallic hydroxides. These metallic hydroxide (MOH) molecules are carried away to be filtered out. However, this process raises the need to accurately and simultaneously place grooves on a surface across a gap which must be very accurately defined, as the setting of the gap will determine the rate and volume at which the metal ions are carried away. Even in simple structures, this problem can be difficult to solve. When the structure is the interior surface of a conical bearing, the setting of the gap width can be extremely difficult. Manufacturability issues associated with conical parts often make it difficult to control the diameter of the cones. Therefore, it is very difficult to make a tool with fixed electrodes that will guarantee a continued consistent work piece to electrode gap. As noted above, the distance is paramount to the accuracy of grooved depth.

In known designs, the gap is varied to yield a predetermined mass flow, and the position of the electrode relative to the work piece is adjusted mechanically to establish the gap. This takes up to thirty seconds in time, which translates directly into manufacturing costs.

The present invention provides a solution to these and other problems, and offers other advantages over the prior art.

SUMMARY OF THE INVENTION

The present invention relates to a critical orifice gap setting for forming grooves in flat plates and conical designs. These accurately placed grooves may be utilized for spindle motors having fluid dynamic bearings.

In one embodiment according to the present invention, a method is provided for electrochemically etching grooves in a working surface. In another embodiment, an apparatus and method are provided for electrochemically etching grooves in a working surface. A frame holds a working surface about an axis and facing a movable electrode movable along the axis. The electrode is axially movable and has a surface carrying a groove pattern to fix on the working surface. A source of electrolyte is pumped at a fixed static pressure rate between the surface of the movable electrode and the working surface. A support fixture is provided for supporting the electrode for movement toward and away from the working surface with minimal frictional restriction. A force biases the electrode surface toward the working surface so that a gap through which the electrolyte flows between the surface of the movable electrode and the working surface is determined primarily by the static flow rate of the electrolyte and the force bias of the electrode toward the working surface.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
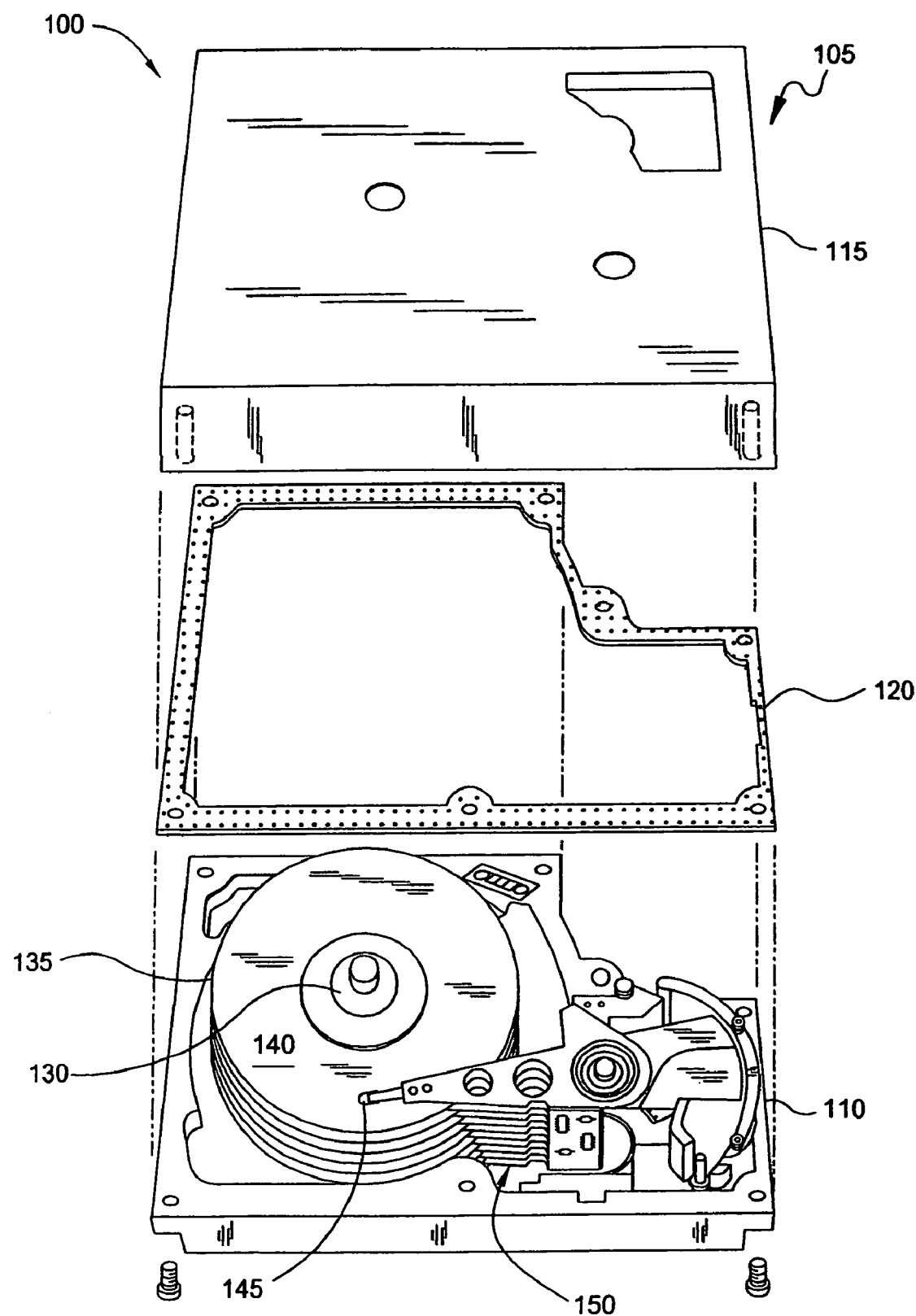
FIG. 1 is an exploded perspective view of the basic elements of a disc drive in which a motor incorporating a counter plate, thrust plate or cone formed by embodiments according to the present invention is especially useful.

FIG. 1 is an exploded perspective view of a magnetic disc drive for which a spindle motor having a fluid dynamic bearing manufactured by the method and apparatus for the present invention is particularly useful. Referring to FIG. 1, a disc drive 100 typically includes a housing 105 having a base 110 sealed to a cover 115 by a seal 120. The disc drive 100 has a spindle 130 to which are attached a number of discs 135 having surfaces 140 covered with a magnetic media (not shown) for magnetically storing information. A spindle motor (not shown in this figure) rotates the discs 135 past read/write heads 145 that are suspended above surfaces 140 of the discs by a suspension arm assembly 150. In operation, the spindle motor rotates the discs 135 at high speed past the read/write heads 145 while the suspension arm assembly 150 moves and positions the read/write heads over one of several radially spaced tracks (not shown). This allows the read/write heads 145 to read and write magnetically encoded information to the magnetic media on the surfaces 140 of the discs 135 at selected locations.

Figure 2:
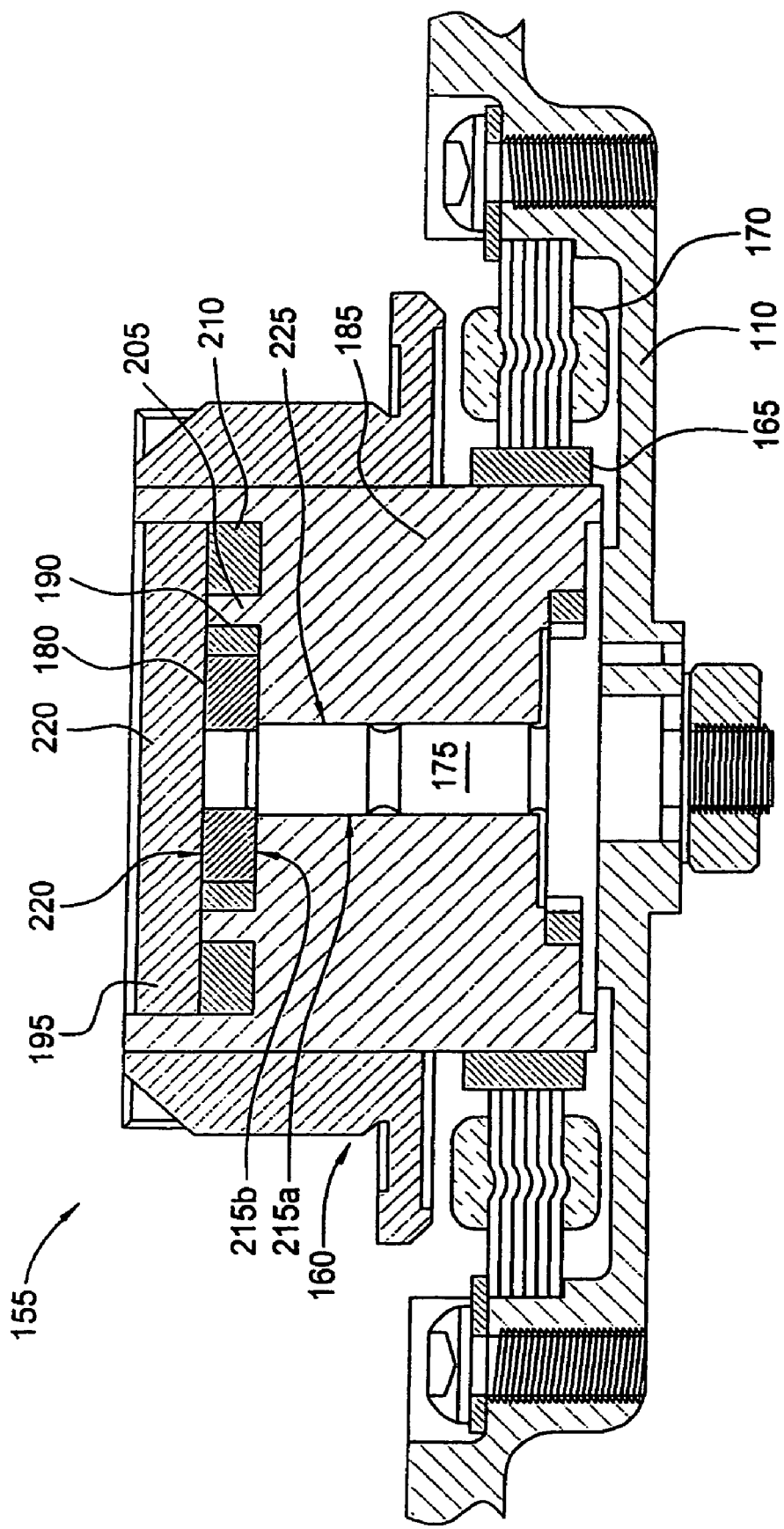
FIG. 2 is a sectional side view of a motor incorporating a counter plate formed by embodiments according to the present invention.

FIG. 2 is a sectional side view of a spindle motor 155 of a type which is especially useful in disc drives 100. Typically the spindle motor 155 includes a rotatable hub 160 having one or more magnets 165 attached to a periphery thereof. The magnets 165 interact with a stator winding 170 attached to the base 110 to cause the hub 160 to rotate. The hub 160 is supported on a shaft 175 having a thrustplate 180 on one end. The thrustplate 180 can be an integral part of the shaft 175, or it can be a separate piece which is attached to the shaft, for example, by a press fit. The shaft 175 and the thrustplate 180 fit into a sleeve 185 and a thrustplate cavity 190 in the hub 160. A counter plate 195 is provided above the thrustplate 180 resting on an annular ring 205 that extends from the hub 160. An O-ring 210 seals the counter plate 195 to the hub 160.

A fluid, such as lubricating oil or a ferromagnetic fluid, fills interfacial regions between the shaft 175 and the sleeve 185, and between the thrustplate 180 and the thrustplate cavity 190 and the counter plate 195. One or more of the thrustplate 180, the thrustplate cavity 190, the shaft 175, the sleeve 185 or the counter plate 195 have pressure generating grooves (not shown in this figure) formed to create fluid dynamic bearings. In one embodiment, the grooves are formed in inner surfaces 215 of the hub 160. In another embodiment, the grooves are formed in the sleeve 185 and in the thrustplate cavity 190. The grooves in the thrustplate cavity 190 form a fluid dynamic thrust bearing 220 by generating a localized region of dynamic high pressure to form a dynamic cushion that rotatably supports the hub 160 in the direction of thrust. Grooves in the inner surface 215a of the sleeve 185 form one or more fluid dynamic journal bearings 225 having dynamic cushions that rotatably support the hub 160 in a radial direction.

Fluid dynamic bearings, as previously implied, are generally formed between rotatable and non-rotatable members having juxtaposed surfaces between which a layer or film of fluid is induced to form a dynamic cushion as an anti-friction medium. To form the dynamic cushion, at least one of the surfaces is provided with grooves that induce fluid-flow in the interfacial region and generate the localized region of dynamic high pressure referred to previously.

As mentioned herein, it is difficult to make a device with fixed electrodes that guarantees a continued consistent work piece to electrode gap. The distance of the gap is paramount to the accuracy of grooved depth.

Given the above, it is necessary to create or define a tool or method used to form the grooves incorporating moving electrodes. Utilizing moving electrodes gives rise to another problem (i.e., how to set the gap between the electrode and the working surface on which the grooves are to be defined). The electrode/work piece gap itself is in many instances the "critical orifice." Critical orifice flow measurement is utilized because the setting of the gap will determine the rate and volume at which the metal ions are carried away, all other parameters being unchanged, and thereby determines the shape and depth of the grooves being formed.

In known designs, as mentioned herein, the gap is varied to yield a predetermined mass flow and the position of the electrode relative to the work piece is adjusted mechanically to establish the gap. This takes up to thirty seconds in time, which translates directly into manufacturing costs. It is desirable to be able to set a gap quickly and accurately with a consistent gap width each time the gap is set.

Figure 3:
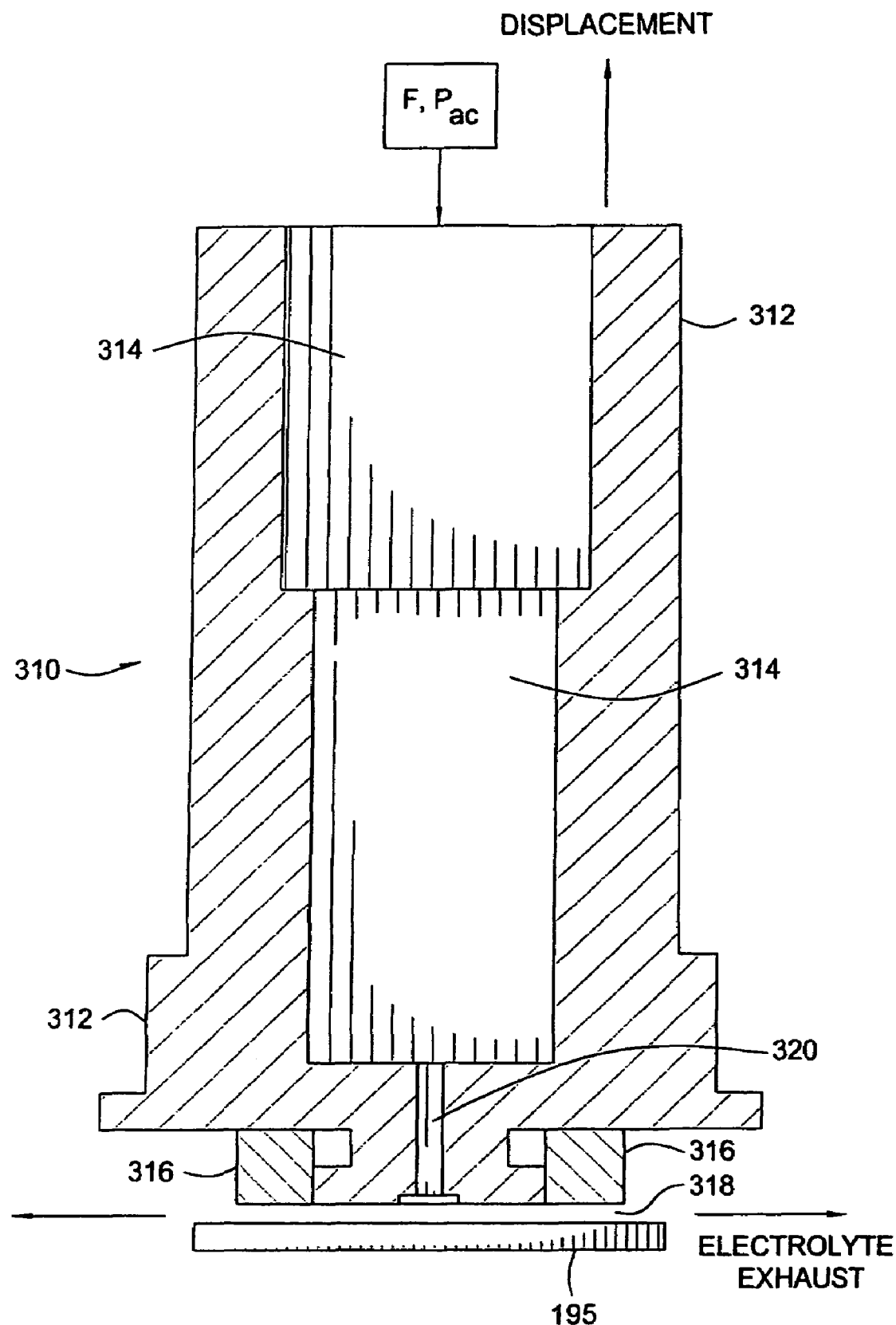
FIG. 3 is a cross-sectional side view of a system used to etch grooves in a counter plate, thrust plate, other flat surface or cone, according to an embodiment of the present invention.

Referring to FIG. 3, one embodiment according to the present invention provides a method and apparatus for forming the pressure generating grooves in a working surface of the counter plate 195. A system 310 comprises counter plate 195, electrode 312, plenum 314, insulation 316, gap 318 (sometimes referred to as "critical orifice gap" or "machining gap") and injection port 320.

In use, in an embodiment, an electrolyte is supplied (as described herein) through the electrode 312 and into the plenum 314. In FIG. 3, the plenum 314 is shown as having a smaller diameter at a proximal end and a larger diameter at a distal end; however, this need not be the case.

Before or after the electrolyte is supplied, the electrode 312 is moved into contact with or proximate the counter plate 195 via a constant downward force F. In one embodiment, F is due to a constant pressure $P_{ac}$ applied by a (substantially) frictionless air cylinder. In other embodiments, F is due to the gravitational pull on a mass or the like.

In an embodiment, electrolyte is supplied through the electrode 312 and into the plenum 314. It is envisioned that the electrolyte is supplied into the plenum 314 by penetrating the electrode in one embodiment. In another embodiment, the electrolyte is supplied into the plenum 314 without penetrating the electrode. The electrolyte is supplied at a constant pressure $P_e$ and with a constant flow rate $Q_e$.

The electrolyte exits the plenum 314 via an injection port 320. The electrolyte comes into contact with the counter plate 195 and disperses in a radial fashion through the gap 318. The force of the electrolyte displaces the electrode 312 in a distal (upward) direction until an equilibrium is reached with the downward force F on the electrode 312. The gap 318 then becomes a critical orifice as the width of the gap 318 will directly affect grooves that will be formed in the counter plate 195.

If $P_e$, $Q_e$ and F are constant then the cross-sectional flow area of the gap 318 will remain constant. In this case, the electrode 312 will hover over the counter plate 195. The gap 318 is automatically established without the need to make an external adjustment.

The insulation 316 prevents unwanted areas of the counter plate 195 from being scathed. The insulation 316 covers all areas of the electrode 312 that are proximate the counter plate 195 for which it is desired that the electrode 312 areas be made ineffectual in forming grooves in the counter plate 195. An electric potential is applied between the electrode 312 and the counter plate 195. Desired grooves are thus formed in the counter plate 195 as described herein.

Figure 4:
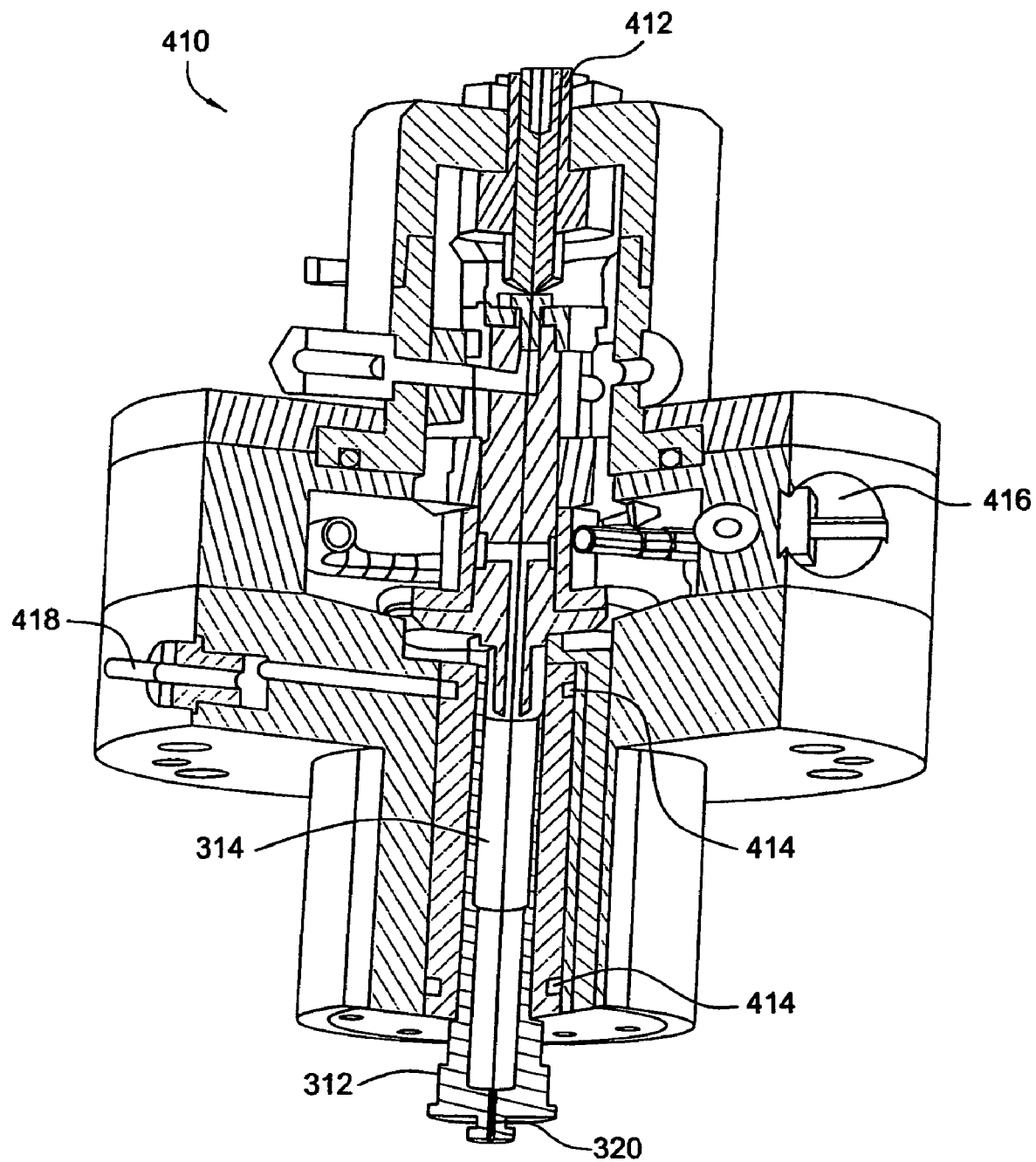
FIG. 4 is a perspective view with a partial carve-out of a hydrostatic bearing cartridge assembly, according to an embodiment of the present invention.

FIG. 4 is a perspective view with a partial carve-out of a hydrostatic bearing cartridge assembly 410 according to an embodiment of the present invention. The electrode 312 is slidably positioned within the hydrostatic bearing cartridge assembly 410 and protrudes from a proximal end thereof. The hydrostatic bearing cartridge assembly 410 provides a (substantially) frictionless way for the electrode 312 to slide up and down.

As mentioned herein, a (substantially) frictionless air cylinder 412 imparts a force F to the electrode 312 in a proximal (downward) direction. The electrode 312 is free to slide up and down with substantially no friction due to hydrostatic bearings 414. Electrolyte is supplied into the plenum 314 via a first inlet 416. Electrolyte is supplied to the hydrostatic bearings 414 via a second inlet 418. $P_{ac}$ and $P_e$ are controlled and maintained constant via a super-precision regulator(s), which is known to those of ordinary skill in the art.

Figure 5:
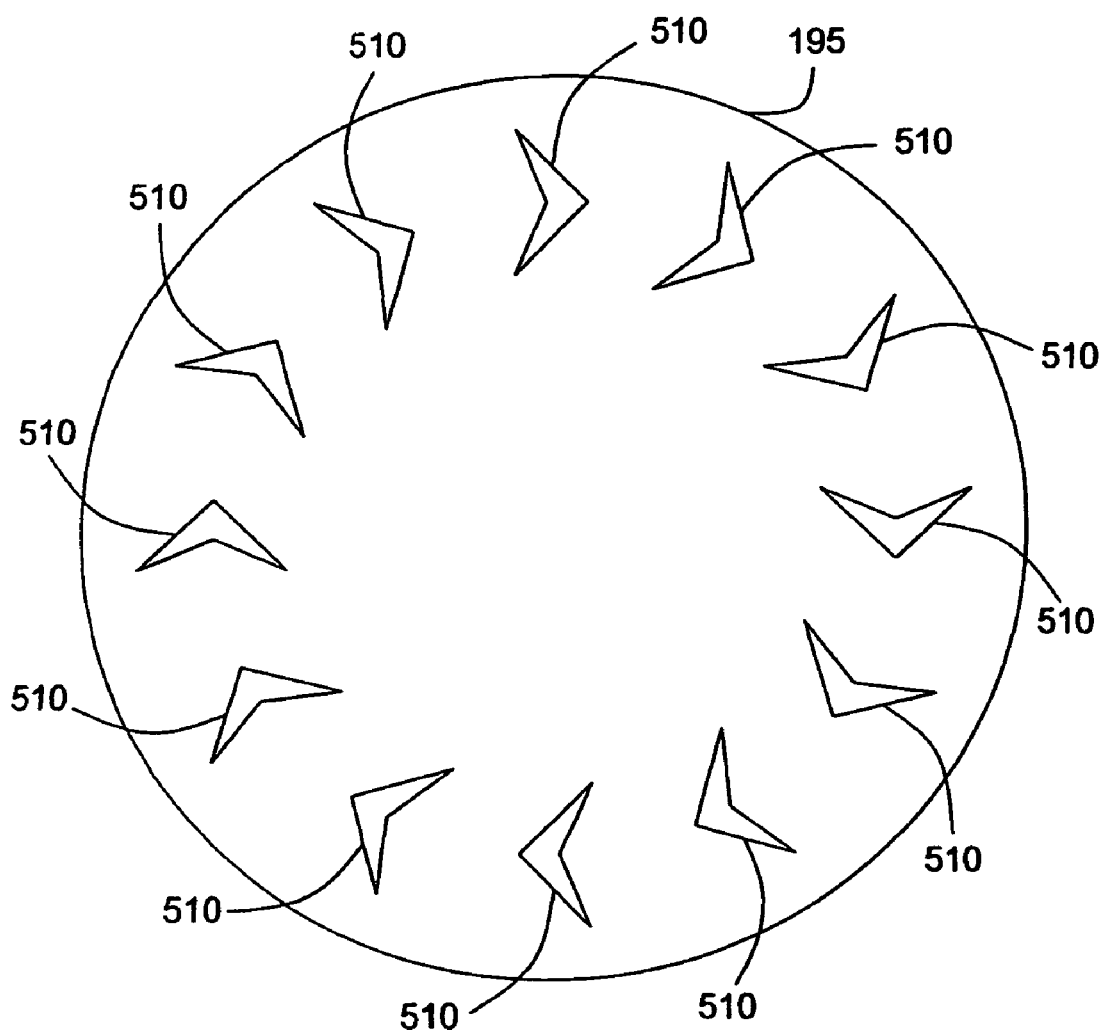
FIG. 5 is a bottom view of an exemplary counter plate having grooves etched therein by an embodiment of an apparatus and method according to the present invention.

FIG. 5 is a bottom view of an exemplary counter plate 195 having grooves etched therein by an embodiment of an apparatus and method according to the present invention. FIG. 5 merely depicts an exemplary embodiment of grooves 510 formed according to methods described herein. The grooves, which are separated by ribs or raised lands, can have a depth of from about 0.009 to 0.015 mm, although they are not limited to this range. Generally, the grooves are shaped and arranged to form a chevron or herringbone pattern. That is, the grooves are made up of two straight segments that meet at an angle to define a "V" shape. Alternatively, the grooves define a pattern that has an arcuate or sinusoidal shape, or may be of any other pattern; the present invention is useful to form any desirable pattern.

Thus the present invention represents a significant advancement in the field of fluid dynamic bearing motor design. Wear is significantly reduced by providing an accurate and relatively inexpensive method of forming grooves on a counter plate 195. It is contemplated that embodiments of the apparatus and methods described herein can be used to etch grooves of varying configurations. Moreover, it is envisioned that embodiments of the apparatus and methods described herein can be used to etch grooves in any suitable plate, conical element or the like.

While the foregoing is directed to embodiments of the invention, other and further embodiments of the invention may be devised without departing from the basic scope thereof, and the scope thereof is determined by the claims that follow.

What is claimed is:

1. A method for defining a critical orifice to form grooves on a work piece comprising:
    providing a first predetermined force to a first portion of an electrode directed to move the electrode toward the work piece, wherein at least a portion of the electrode has a surface including a groove pattern; and
    providing a second predetermined force, utilizing a fluid, to a second portion of the electrode directed to move the electrode away from the work piece, wherein the fluid is passed at a fixed static pressure rate between the second portion of the electrode and the work piece;
    wherein, by way of the first predetermined force and the second predetermined force utilizing the fluid, the electrode is situated for reaching and maintaining a force equilibrium position in a predetermined three dimensional orientation relative to the work piece, the equilibrium position defining the critical orifice with the work piece, and the force equilibrium position reached prior to initiation of the groove formation.

2. The method as in claim 1, wherein providing the first predetermined force comprises utilizing a frictionless air cylinder.

3. The method as in claim 1, wherein providing the second predetermined force comprises passing the fluid via a channel through the electrode toward the work piece.

4. The method as in claim 1, further comprising radially constraining the electrode utilizing a hydrostatic bearing adjacent to the electrode.

5. The method as in claim 4, wherein utilizing a hydrostatic bearing comprises employing an upper hydrostatic bearing and a lower hydrostatic bearing.

6. The method as in claim 5, further comprising supplying one a fluid to at least one of the upper hydrostatic bearing and the lower hydrostatic bearing, wherein the upper hydrostatic bearing and the lower hydrostatic bearing are configurable to a predetermined pressure and separately controlled for one of allowing the electrode to pivot and radially constraining the electrode.

7. The method as in claim 1, further comprising applying an electrical potential between the electrode and the work piece utilizing an electrochemical machining process to groove the work piece, wherein passing a fluid comprises passing an electrolyte.

8. The method as in claim 1, wherein the work piece is one of a flat surface, a counterplate, a thrustplate, and a cone.

9. The method as in claim 1, further comprising supporting the electrode for movement, utilizing a cartridge having a cavity for receiving the electrode.

10. The method as in claim 1, further comprising holding the work piece about an axis and facing the electrode movable along the axis, utilizing a frame to receive the work piece.

11. A method for defining a critical orifice to electrochemically etch grooves on a surface of a fluid dynamic bearing utilized in a spindle motor comprising:
    providing a first predetermined force to a first portion of an electrode directed to move the electrode toward the work piece, wherein at least a portion of the electrode has a surface including a groove pattern; and providing a second predetermined force, utilizing a fluid, to a second portion of the electrode directed to move the electrode away from the work piece, wherein the fluid is passed at a fixed static pressure rate between the second portion of the electrode and the work piece;

wherein, by way of the first predetermined force and the second predetermined force utilizing the fluid, the electrode is situated for reaching and maintaining a force equilibrium position in a predetermined three dimensional orientation relative to the work piece, the equilibrium position defining the critical orifice with the work piece, and the force equilibrium position reached prior to initiation of the groove formation.

12. The method as in claim 11, wherein providing the first predetermined force comprises utilizing a frictionless air cylinder.

13. The method as in claim 11, wherein providing the second predetermined force comprises passing the fluid via a channel through the electrode toward the work piece.

14. The method as in claim 11, further comprising radially constraining the electrode utilizing a hydrostatic bearing adjacent to the electrode.

15. The method as in claim 14, wherein utilizing a hydrostatic bearing comprises employing an upper hydrostatic bearing and a lower hydrostatic bearing.

16. The method as in claim 15, further comprising supplying a fluid to at least one of the upper hydrostatic bearing and the lower hydrostatic bearing, wherein the upper hydrostatic bearing and the lower hydrostatic bearing are configurable to a predetermined pressure and separately controlled for one of allowing the electrode to pivot and radially constraining the electrode.

17. The method as in claim 11, further comprising applying an electrical potential between the electrode and the work piece to groove the work piece, wherein passing a fluid comprises passing an electrolyte.

18. The method as in claim 11, wherein the work piece is one of a flat surface, a counterplate, a thrustplate, and a cone.

19. The method as in claim 11, further comprising supporting the electrode for movement, utilizing a cartridge having a cavity for receiving the electrode.

20. The method as in claim 11, further comprising holding the work piece about an axis and facing the electrode movable along the axis, utilizing a frame to receive the work piece.

* * * * *

UNITED STATES PATENT AND TRADEMARK OFFICE
CERTIFICATE OF CORRECTION

PATENT NO.        : 7,632,391 B2                                            Page 1 of 1
APPLICATION NO. : 11/270964
DATED             : December 15, 2009
INVENTOR(S)       : Dustin Alan Cochran It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this

Second Day of November, 2010

David J. Kappos
*Director of the United States Patent and Trademark Office*